United States Patent [19]  
Furukawa

[11] 4,114,170  
[45] Sep. 12, 1978

[54] FLASH MECHANISM FOR CAMERA

[75] Inventor: Akio Furukawa, Kawasaki, Japan

[73] Assignee: Ricoh Company, Ltd., Tokyo, Japan

[21] Appl. No.: 796,072

[22] Filed: May 12, 1977

[30] Foreign Application Priority Data

May 12, 1976 [JP] Japan .............................. 51-60027[U]
May 12, 1976 [JP] Japan .............................. 51-60028[U]

[51] Int. Cl.² ........................ G03B 7/16; G03B 15/03; G03B 13/02
[52] U.S. Cl. ...................................... 354/149; 354/32; 354/196
[58] Field of Search ............... 354/139, 149, 196, 274, 354/230, 231, 27, 28, 32, 26, 23 D

[56] References Cited  
U.S. PATENT DOCUMENTS

| 3,037,439 | 6/1962 | Rentschler | 354/32 |
| 3,118,356 | 1/1964 | Sauer et al. | 354/32 |
| 3,162,111 | 12/1964 | Köppen et al. | 354/149 X |
| 3,169,464 | 2/1965 | Köppen | 354/196 |
| 3,257,920 | 6/1966 | Greger et al. | 354/149 |
| 3,620,151 | 11/1971 | Kitai | 354/196 |

Primary Examiner—Donald A. Griffin  
Attorney, Agent, or Firm—Cooper, Dunham, Clark, Griffin & Moran

[57] ABSTRACT

A flash mechanism for use with cameras comprising a program shutter, a diaphragm linkage lever, an intermediate linkage lever for a flash illumination device, a distance ring, and an exposure correction member, such as a correction element for the guide numbers of the illumination device or a correction element for film sensitivity on which the distance ring is mounted, wherein the rotation center of the distance ring is slightly deviated from the rotation center of the exposure correction member so that the distance ring may be used in both the focussing operation and the film sensitivity setting with a flash illumination device.

3 Claims, 6 Drawing Figures

FLASH MECHANISM FOR CAMERA

BACKGROUND OF THE INVENTION

This invention relates in general to a so-called flash mechanism for use with cameras, which permits automatic proper diaphragm settings to be achieved in the mechanism linkage with the rotation of a distance ring in flash photography utilizing flash lamps or the like, and more particularly involves a flash mechanism having an exposure correction member.

Various types of flash mechanism for use with cameras have been known and some of them are used in practice.

In cameras having flash mechanisms which permit automatic proper diaphragm settings in accordance with the setting of a distance ring, the types of flash mechanism can be classified as follows:

(1) the type having an exposure correction member, such as a correction element for the guide members of an illumination device or a correction element for film sensitivity; or (2) the type having no such exposure correction member; and (3) the so-called program shutter type which has means that serve both as diaphragm blades and shutter blades; or (4) the ordinary shutter type having diaphragm blades and shutter blades separately.

Thus, a particular camera may incorporate either of types (1) or (2) with either of types (3) or (4).

With respect to the flash mechanism having an exposure correction member, it can be classified into two subtypes depending upon whether the member works electrically or mechanically.

The flash mechanism of the present invention is of the type having a mechanical exposure correction member and is applicable to simple and inexpensive cameras.

Several kinds of flash mechanism belonging to the type of the present invention have been known.

However, in the conventional mechanism of this type, the linkage relations are very complex and there are many contacting portions of pins and cam surfaces. Thus, it is inevitably subject to high production cost.

Moreover, in the conventional mechanism, since the stretches of component members in the direction of the optical axis and also in the direction normal to the optical axis are great, a large housing space is necessary. In addition, the frictional resistances are great and accordingly the operation is apt to become unsmooth.

SUMMARY OF THE INVENTION

It is, therefore, an object of this invention to simplify the linkage relations and reduce the contact portions of component members in number and thus make the production cost less expensive and minimize the stretches of component members so as to accomplish smooth operation of the flash mechanism.

Another object of this invention is to increase the linkage accuracy by making the rotation angle of a distance ring and that of an exposure correction member comparatively large.

A feature of this invention is that there is provided a flash mechanism comprising: a diaphragm linkage lever which appears in the rotation path of a driving pin of diaphragm blades when an illumination device is attached, and which retreats from the rotation path of the pin when the illumination device is detached; a distance ring having a distance cam, which is in contact with a lever which operates the diaphragm linkage lever, on its outer peripheral surface; and an exposure correction member which supports and is relatively rotatable to the distance ring, and wherein the rotation center of the distance ring is slightly deviated from the rotation center of the exposure correction member.

In this invention, as the exposure correction member, a correction element for the guide numbers of the illumination device or a correction element for film sensitivity can be utilized.

According to the present invention, the linkage relations and other mechanism are exceedingly simplified so that the production cost is made less expensive and also the stretches of component members are minimized so that the housing space is reduced, and a smooth operation of the flash mechanism is accomplished.

In addition, the linkage accuracy is greatly increased by the design of making the rotation angle of the distance ring and that of the exposure correction member comparatively large.

DETAILED DESCRIPTION OF PREFERRED EMBODIMENT

Figure 1:
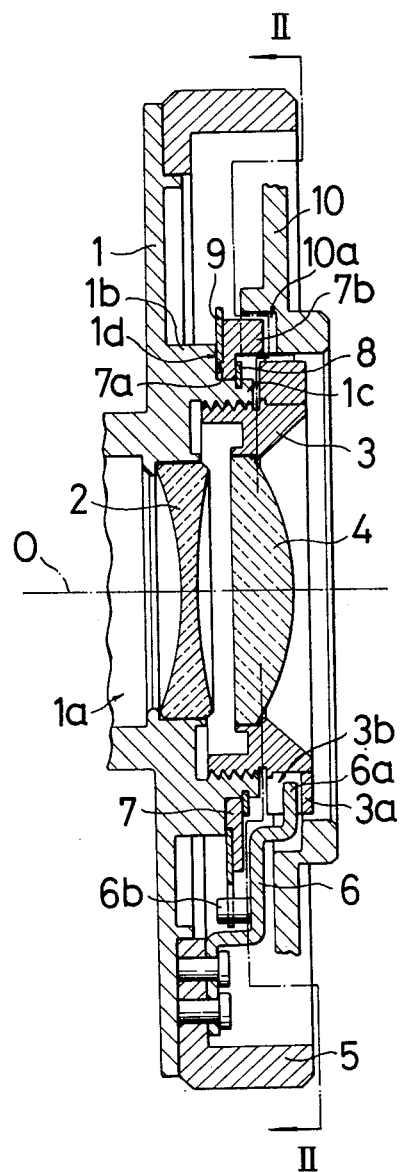
FIG. 1 is a sectional end view of an embodiment according to the present invention taken along the chain lines I—I of FIG. 2.
Figure 2:
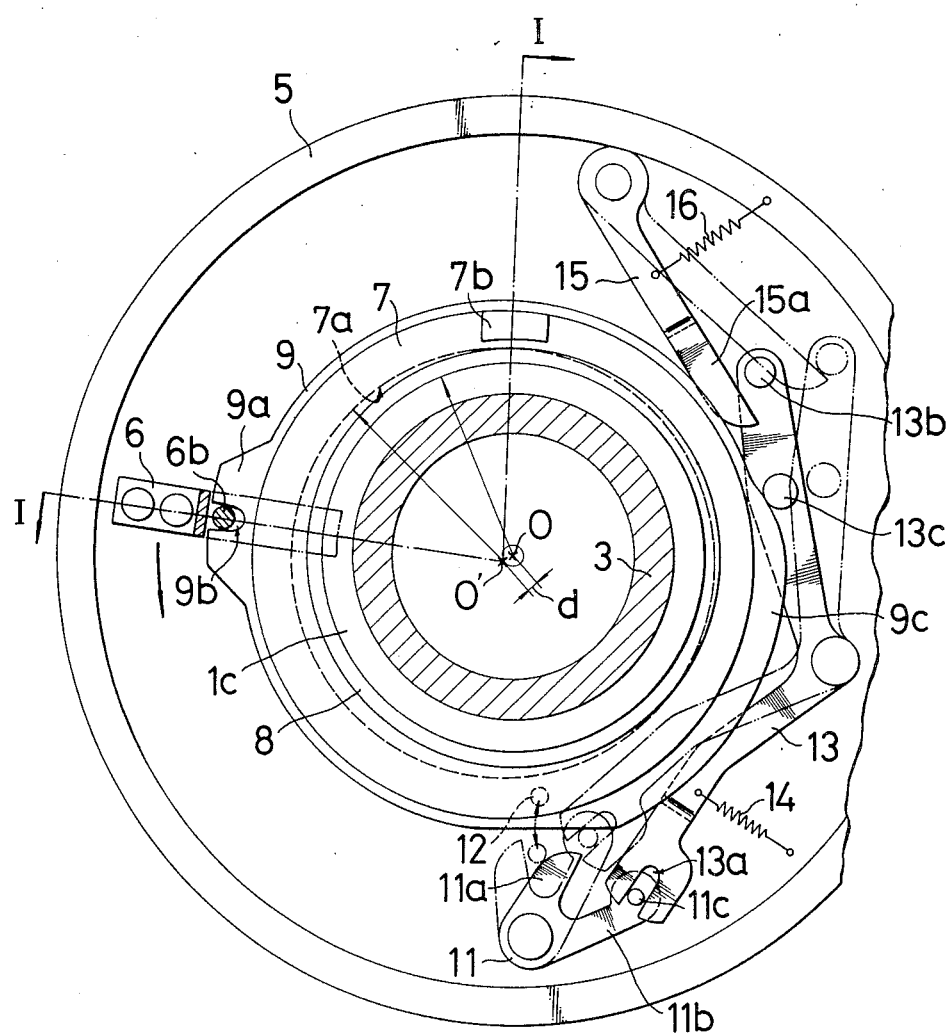
FIG. 2 is a sectional view of the embodiment taken along the chain lines II—II of FIG. 1.

In FIG. 1 and FIG. 2, a camera imaging apparatus is shown wth one of two conponent lenses, that a biconcave lens 2 is held in a round opening 1a in base plate 1, which is mounted in the front of a conventional camera. The opening is formed so as to be coaxial with the optical axis 0 of the lens 2.

Together with this lens 2, a focussing lens 4 is also held coaxially in the opening 1a by means of a lens cell 3 which is screwed into the inner peripheral surface of a short cylinder portion 1b projecting forward (right side in FIG. 1) from the base plate 1.

Thus, when the lens cell 3 is rotated about the optical axis 0, the lens cell 3 is moved backwards and forwards on the optical axis 0 along the screw threads inside the cylinder portion 1b. In the embodiment of this invention, the focussing is performed by rotating the front focussing lens 4.

On the lens cell 3 is fixed a peripheral flange 3a, and into a vacant portion 3b formed in part of the flange is projected a free end 6a of a connecting plate 6 extending integrally from a focussing operation ring 5. Rotation of the ring 5 causes rotation of the focussing lens 4 through cooperation of the end 6a and flange 3a.

At the outer peripheral surface of the cylinder portion 1b is formed a small diameter cylinder portion 1c into which an exposure correction member 7 is rotatably fitted and is prevented from being pulled out by a stop ring 8.

The rotation center of the exposure correction member 7 is on the optical axis 0 of the lenses, while at the rear surface of the member 7, a smaller diameter cylinder portion 7a is formed. The peripheral edge of portion 1a follows the circumference of a circle having an eccentric center disposed a distance d slightly apart from the optical axis 0 of the lenses (see FIG. 2) about the cylinder portion 7a is rotatably fitted a distance ring 9.

As best seen in FIG. 2 part of the outer circumference of the distance ring 9 is formed with a projecting portion 9a in which a groove 9b is formed in the radial direction with respect to the ring. In the groove 9b is engaged a pin 6b, which is fixed on connecting plate 6.

Thus, when the focussing operaton ring 5 is rotated about the optical axis 0, the lens cell 3 is rotated through the engagement of flange 3d with the end 6a of the connecting plate 6 and at the same time, the distance ring 9 is rotated on cylinder portion 7a about the eccentric axis 0' through the engagement of the pin 6b with projecting portion 9a.

The distance ring 9 also has a distance cam 9c formed on the opposite side of its outer circumference from the projecting portion 9a.

On part of the front surface of the exposure correction member 7, a projecting portion 7b is formed, which is engaged in a vacant portion 10a of an exposure correction operation member 10 (see FIG. 1).

Thus, by rotating the member 10, the exposure correction operation member 7 is rotated about the optical axis 0, causing the eccentric axis 0' of cylinder portion 7a to be moved whereby the central axis of the distance ring 9 concident therewith makes a parallel movement along the circumference of a circle having a radius d of the distance between the optical axis 0 and the eccentric axis 0'. Also the exposure adjustment members in the automatic exposure adjustment circuit of the camera, such as those setting the size of the diaphragm positioned at the front surface of the light-receiving element, are varied as will be understood by those skilled in the art.

In the lower portion of FIG. 2, a diaphragm linkage lever 11 comprising a bell crank is fixed. The lever 11 has one arm 11a formed in the shape of a cam at the outer edge which is positioned in the rotation passage of a diaphragm pin 12.

On the other arm 11b of the lever 11 is fixed a pin 11c, which is engaged in a forked portion 13a at one end of an intermediate lever 13 which is part of a linkage with an illumination device.

The intermediate lever 13 is pivoted toward its center and has a pin 13b at the other end and another pin 13c in the middle of the arm containing pin 13b.

Further, the intermediate lever 13 is given a counterclockwise bias about its pivot by a spring 14 as shown in FIG. 2. However, the rotation of the lever is hindered by the pin 13c being brought into contact with the distance cam 9c of the distance ring 9.

At one side of the pin 13b of the intermediate lever 13 is positioned the free end 15a of an illumination linkage lever 15. The lever 15 is given a counterclockwise bias about an end pivot by a spring 16. However, when an illumination device is attached to the camera in the condition of FIG. 2 is established, wherein the lever 15 is held against the bias of spring 16 and a suitable space is kept between the free end 15a of the lever 15 and the pin 13b. The levers 15, 13 and 11 are thus normally positioned as shown in FIG. 2 when flash photography is to be used.

Figure 3:
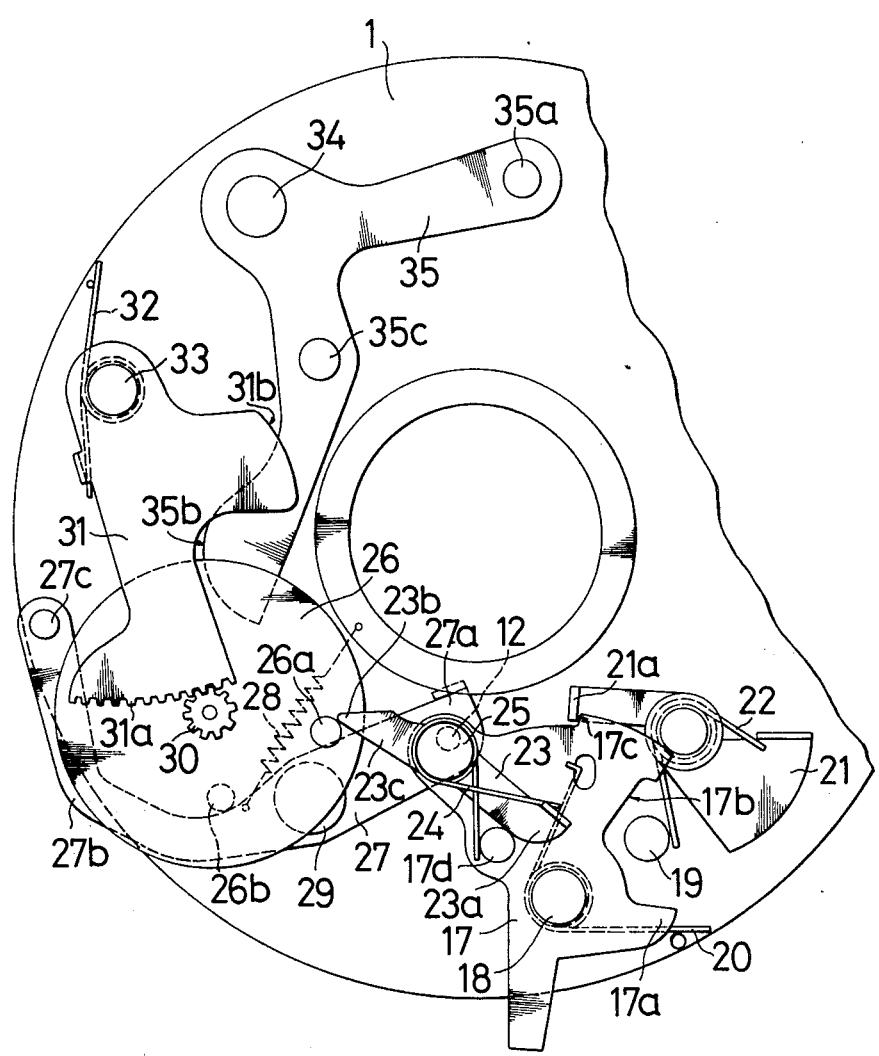
FIG. 3 is a rear view of the embodiment shown in FIG. 2.

FIG. 3 shows the arrangement of component elements on the back side of the base plate 1.

In the lower portion of the Figure, a shutter set lever 17 is supported rotatably on a shaft 18. The rotation range of the lever is limited to the space between a pin 19 fixed on the base plate 1 and projecting arm 17a of lever 17 and side edge portion 17b. The lever 17 is given a counterclockwise bias by a leaf spring 20. However, it is held against the counterclockwise bias in the position shown in FIG. 3, by cutaway portion 17c at the upper end of the lever 17 being engagingly stopped by the bent end 21a of shutter release lever 21, in which condition spring 20 is energized.

The shutter release lever 21 is given a counterclockwise bias by spring 22. However, it is turned clockwise against the counterclockwise bias during the shutter release operation so that the engaging stop of the shutter set lever 17 is released. At the left side upper portion of the lever 17, a single direction rotating lever 23 is mounted. The lever 23 is given a clockwise bias about a shaft 25 on lever 17 by spring 24. However, the rotation of the lever 23 by the clockwise bias is hindered by arm 23a being brought into contact with a pin 17d fixed on the lever 17, and the slantingly cut free end portion 23b of other arm 23c projecting into the rotation passage of a pin 26a fixed on a flywheel 26.

The previously mentioned diaphragm pin 12 in FIG. 2 is fixed on an arm 27a of a sickle-shaped diaphragm driving lever 27 shown in FIG. 3. The pin 12 is loosely passed through the elliptic opening of the diaphragm blades (not shown) as found in the opening and closing mechanism of the diaphragm blades in general use with conventional cameras so that the diaphragm blades are opened and closed by the movement of the pin 12. In the rotating position of the lever 27 as shown in FIG. 3, the diaphragm blades are closed by the diaphragm pin 12.

The diaphragm driving lever 27 is given a clockwise bias about a shaft 29 by the elasticity of a spring 28. However, in the condition as shown in FIG. 3, the side edge of arc-shaped arm 27b is pushed by a pin 26b fixed at the back side of the flywheel 26 and is in the condition of being urged counterclockwise against the clockwise bias on the lever 27 and thus the diaphragm blades are closed as mentioned previously.

The flywheel 26 has a small gear 30 sharing the same shaft. The small gear is engaged with a partial gear 31a formed on a time lag lever 31.

The time lag lever 31 is given a clockwise bias about shaft 33 by a spring 32. In the condition as shown in FIG. 3, the time lag lever is placed in the position of the clockwise bias limit by suitable regulating members. At the upper right side of the lever 31 is mounted a shutter speed changeover lever 35 on a shaft 34. A pin 35a at one end of the changeover lever 35 is connected with a movable member (not shown) whose movement is regulated in accordance with the swinging angle of the pointer of the ammeter in the automatic exposure adjustment circuit of the camera, and the lever 35 is turned clockwise by pushing down the camera shutter release button.

When the luminance of a subject is comparatively high and the swinging angle of the pointer of the ammeter is great, the lever 35 is greatly rotated clockwise. However, in the opposite case, that is, when the luminance of a subject is low and the swinging angle of the pointer of the ammeter is small, the clockwise rotation of the lever 35 is small.

At the other arm end of the lever 35 is formed an arc-shaped cam edge 35b, which is positioned in the rotation path of a pin 27c fixed at one end of the diaphragm driving lever 27. On the same arm of the lever 35 is fixed a pin 35c in the rotation path of a cam edge 31b which is formed projecting from the side of the time lag lever 31.

In the following paragraph, the action of the present invention constructed as mentioned above is explained by classifying photography into automatic exposure photography by natural light and artifical or flash illumination photography.

AUTOMATIC EXPOSURE PHOTOGRAPHY BY NATURAL LIGHT

When automatic exposure photography by natural light is performed without incorporation or attaching an illumination device on the camera the illumination device linkage lever 15 shown in FIG. 2 is turned to the position shown by the chain line in accordance with the bias thereof and the pin 13b is pushed clockwise against the bias thereof so that the diaphragm linkage lever 11 is turned to the position shown by the chain line.

In this rotating condition, the diaphragm pin 12 can freely enter between arms 11a and 11b of the diaphragm linkage lever 11.

Subsequently when the forward film winding operation is performed, the condition as shown in FIG. 3 is achieved through suitable interconnecting means by which the shutter set lever 17 is turned clockwise, energizing the spring 20, and reverse rotation of the lever 17 caused by the bias thereof is engagingly stopped, by the bent end 21a of the shutter release 21 being dropped into the cutaway portion 17c of the lever.

During the clockwise rotation of the lever 17, the free end 23b of the arm of the single direction rotating lever 23 mounted thereon strikes against the pin 26a of the flywheel 26. At this time, the lever 23, rotates counterclockwise against the spring bias thereon about the shaft 25 and moves over the pin 26a, resulting in taking the position as shown in FIG. 3.

In this condition, when the camera shutter release button is pushed down, the shutter speed changeover lever 35 is automatically set by suitable interconnecting means at a rotating position corresponding to the luminance of a subject during the shutter release operation.

When the release button is further pushed down, the shutter release lever 21 is turned clockwise by the interconnecting means against the spring bias thereon in FIG. 3 and thus the engaging stop of the shutter set lever 17 by the bent end 21a of the lever 21 is released, resulting in the shutter set lever 17 being turned counterclockwise by the energized power of the spring 20.

When the shutter set lever 17 is turned counterclockwise, one end 23b of the single direction rotating lever 23 mounted on the shutter set lever 17 kicks the pin 26a of the flywheel 26. In the condition shown in FIG. 3, since the lever 23 is not permitted to rotate clockwise by one arm of the lever 23 being brought into contact with the pin 17d, it is as if the pin 26a of the flywheel 26 is kicked by an arm which is substantially integral with the lever 17. Thus, the flywheel 26 is turned clockwise and thereafter continues to rotate clockwise due to the inertia thereof.

Figure 4:
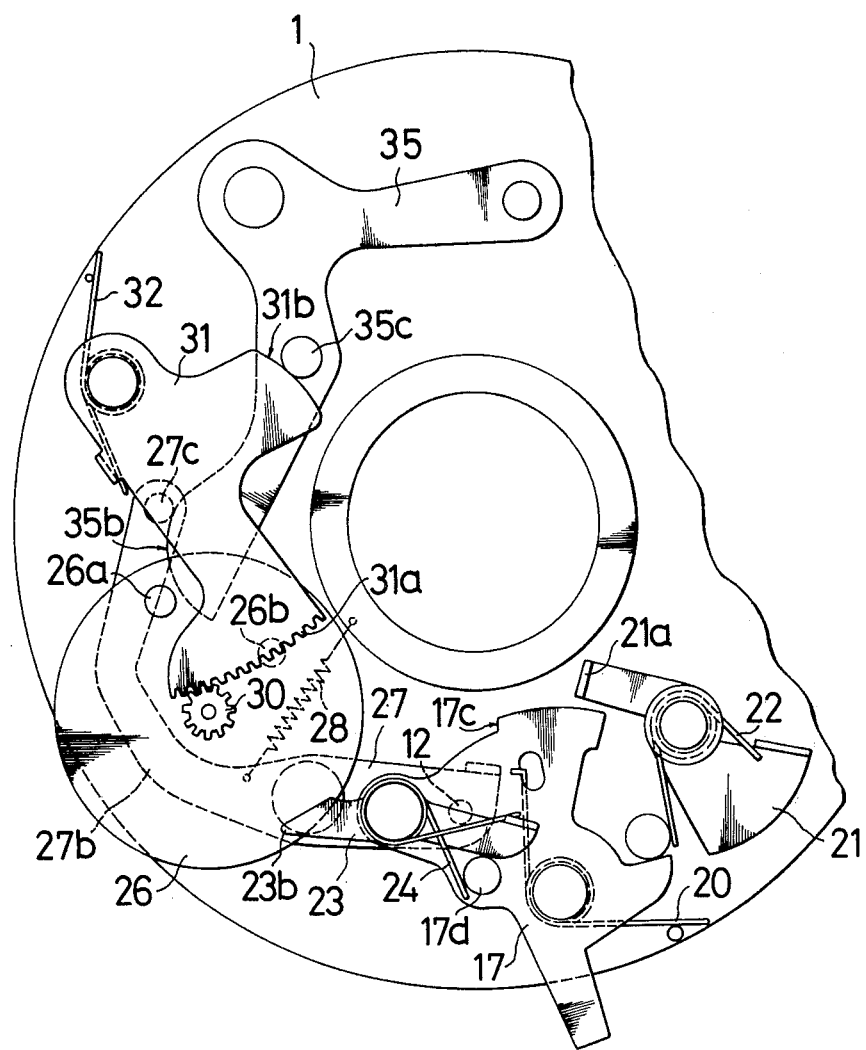
FIG. 4 shows one operational condition of the embodiment of the present invention in accordance with FIG. 3.

During the continuing clockwise rotation of the flywheel 26, the contact of the pin 26b of the flywheel and one arm 27b of the diaphragm driving lever 27 is released so that clockwise rotation of the lever 27 under the bias thereon is allowed and thus the lever 27 continues to rotate clockwise until the pin 27c on the lever 27 is brought into contact with the cam edge 35b of the shutter speed changeover lever 35 (as shown in FIG. 4).

The rotating distance of the diaphragm driving lever 27, which controls the size of the diaphragm opening through pin 12, is determined by the rotating distance that the shutter speed changeover lever 35 has been rotated, that is by the luminance of a subject. When the luminance of a subject is high, as mentioned previously, since the lever 35 is greatly rotated clockwise, the rotation of the diaphragm driving lever 27 is hindered at an early stage and the size of the diaphragm opening is limited very much and when the luminance of a subject is low, the size of the diaphragm is increased.

Due to the clockwise rotation of the flywheel 26, the time lag lever 31 is rotated counterclockwise against the bias thereof through the small gear 30 and the partial gear 31a. The counterclockwise rotation of the lever 31 is hindered by the cam edge 31b of the lever 31 being brought into contact with the pin 35c on the shutter speed changeover lever 35 (refer to FIG. 4).

The contact position of the cam edge 31b and the pin 35c is determined by the rotating position of the lever 35 as in the previously mentioned case, and when the luminance of a subject is high, the rotation of the lever 31 is hindered at an early stage, and when the luminance of a subject is low, the rotation of the lever 31 is hindered at a later stage.

Each linkage element is arranged so that the timing is such that the clockwise rotation of the diaphragm driving lever 27 is hindered earlier than the counterclockwise rotation of the time lag lever 31.

Figure 5:
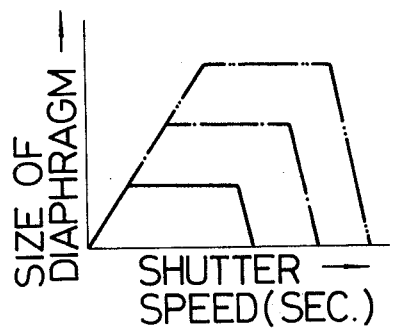
FIG. 5 is an operational diagram of the diaphragm blades showing the size of the diaphragm opening over a period of time in automatic exposure photography by natural light in the above embodiment.

When the counterclockwise rotation of the time lag lever 31 is hindered, the inertia of flywheel 26 is overcome so that the lever 31 is immediately returned to the original position thereof by the bias thereon. Together with this, through gears 30 and 31a, the rotation of the flywheel 26 and the diaphragm driving lever 27 are reversed and they are returned to the respective original positions thereof as shown in FIG. 3 so that the diaphragm is closed. FIG. 5 illustrates schematically the action of the diaphragm blades during the above mentioned operation for periods of time corresponding to different levels of illumination with natural light.

As can be seen from the figure, when the luminance of a subject is high, the opening of the diaphragm blades is limited and thus small and the blades are closed at an early stage so that the shutter speed is high. On the other hand, as the luminance of a subject becomes low, the opening of the diaphragm blades becomes large and the shutter speed longer.

Focussing on a subject is performed by rotating the focussing operation ring 5 shown in FIGS. 1 and 2, whereby as mentioned previously, the focussing lens 4 is moved forwards and backwards until proper focussing is achieved.

In accordance with the light sensitivity of the loaded film, the exposure correction operation member 10 is rotated, whereby as mentioned previously, the film sensitivity changeover elements of the camers, for example, the diaphragm attached in front of the light receiving element, are varied so that the film sensitivity is set.

ARTIFICIAL OR FLASH ILLUMINATION PHOTOGRAPHY

Upon incorporating or attaching a flash illumination device, the illumination device linkage lever 15 is turned clockwise by suitable interconnecting means against the bias of spring 16 thereon to the position shown by the solid line in FIG. 2 and the intermediate lever 13 is released from the restriction by the lever 15 so that the lever 13 is turned counterclockwise due to the bias thereof of spring 14 thereon until the pin 13c integrated with the lever 13 is brought into contact with the distance cam 9c. Also, the diaphragm linkage lever 11 is turned clockwise to the position shown by the solid line under this action.

When the lever 11 is placed in that position, the arm 11a of the lever is advanced into the path of the diaphragm pin 12. Further, in the linkage with the attachment of an illumination device is a means by which the main switch of the automatic exposure circuit of the camera is turned off.

As mentioned previously, when the film is wound forward, the shutter set lever 17 is placed in the position shown in FIG. 3. When the shutter release button is pushed down in this condition, the flywheel 26 is turned clockwise by the energy stored in the spring 20 as in the case of previously mentioned photography by natural light, and thus the diaphragm blades are opened by the clockwise turn of the diaphragm driving lever 27. However, in this case the opening size of the diaphragm blades is determined by the position at which the diaphragm pin 12 is brought into contact with one arm 11a of the diaphragm linkage lever 11.

The contacting position of the diaphragm pin 12 and the diaphragm linkage lever 11 is set by the distance the lever 11 has been rotated by the intermediate lever 13. The rotating quantity of the lever 13 is determined by the contacting position of the pin 13c and the distance cam 9c, which position is determined by the rotating quantity of the distance ring 9.

Thus, when the position of the distance ring 9 is set by the rotation of ring 5 to a position so as to focus the camera on a subject at a comparatively long distance, the pin 13c of the intermediate lever 13 comes into contact with a comparatively small lift portion of the distance cam 9c, and the rotation of the levers 13 and 11, caused by their respective biases becomes great, permitting the movement stroke of the diaphragm pin 12 through a great range and resulting in the diaphragm opening becoming great.

On the otherhand, when the distance ring 9 is turned counterclockwise with ring 5 in order to focus on a subject at a comparatively short distance in FIG. 2, the pin 13c of the intermediate lever 13 is brought into contact with the distane cam 9c in the great lift portion thereof, and the rotating quantity of the lever becomes small, which permits the movement stroke of the diaphragm pin 12 only through a small range, resulting in a diaphragm opening that is limited or small. As a matter of course, along with the rotation of the distance ring 9, the focussing lens 4 (refer to FIG. 1) is moved forwards and backwards in the direction of the optical axis so that the focussing of a subject can be performed.

The film sensitivity setting in the case of the automatic exposure photography by natural light is performed in the camera's automatic exposure adjustment circuit.

However, in the case of artificial or flash illumination photography, since the automatic exposure adjustment circuit is set inoperable, the film sensitivity setting must be performed by another means.

In the embodiment of this invention the film sensitivity setting is accomplished by the exposure correction system. More particularly when the exposure correction member 7 is rotated together with the exposure correction operation member 10, the distance ring 9 also moves therewith. As previously described, distance ring 9 is rotatably mounted on the eccentrically centered small diameter portion 7a of the exposure correction member, makes a parallel movement with member 7 along the circumference of a circle whose radius is the distance $d$ between the eccentric axis 0' and optical axis 0 (refer to FIG. 2). Thus, distance ring 9 is moved laterally in FIG. 2 by the rotation of exposure correction member 7), whereby the contacting position of the pin 13c of the lever 13 with the distance cam 9c may be varied and accordingly the rotating quantity of the lever 13 and the lever 11. It will be seen that if member 10 is associated with a correction element for the guide members of the illumination device or a correction element for film sensitivity, its rotation results in changing the diaphragm opening. Thus the correction for the diaphragm opening in accordance with the film sensitivity is made through the exposure correction system.

In the case of artificial illumination photography, the shutter speeds have to be comparatively slow, taking into consideration the case of illumination by flash lamp.

According to the embodiment of the present invention, at the time of flash illumination photography, since the main switch of the circuit of the automatic exposure meter is turned off, the pointer of the ammeter of the circuit is not swung at all. Therefore, the shutter speed changeover lever 35 is scarcely rotated by pushing down the shutter release button, and the time lag lever 31, which is rotated by the rotation of the flywheel 26, is not limited in rotation until the cam edge 31b of the time lag lever 31 is brought into contact with the pin 35c of the lever 35 at the position of the maximum rotating quantity of the time lag lever 31. Immediately after this, the levers 31, 27 and the flywheel 26 are returned to their respective original positions by the elasticity of spring 32 so that the diaphragm blades are closed.

The shutter speed at this time is approximately on the level of the minimum shutter speed in the case of automatic exposure photography by natural light, for example, about 1/30 seconds, and is always constant.

Figure 6:
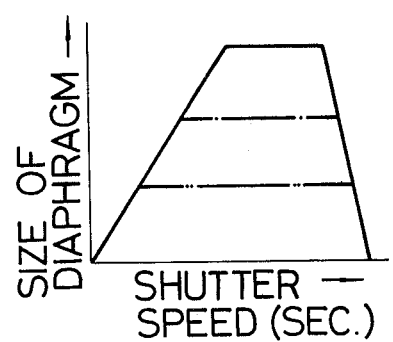
FIG. 6 is an operational diagram of the diaphragm blades in flash photography in the above embodiment.

FIG. 6 illustrates schematically the action of the diaphragm blades during the above mentioned period of time.

In accordance with this, the shutter speed is constant, but the size of the diaphragm opening varies in accordance with the focussing length for a subject. Thus, it can be understood that the size of the diaphragm opening is automatically adjusted so as to obtain a proper exposure even if the focussing length varies each time.

In the embodiment according to this invention, an EE camera is utilized, which is in mechanical linkage with the pointer of the ammeter in the circuit of the exposure meter.

However, the flash mechanism of the present invention is applicable not only to this type of camera but also to an electrical shutter type program EE camera.

In the case of artificial illumination photography utilizing this latter sort of camera, the time control circuit of the electric shutter is set at a shutter speed suitable for flash illumination photography.

Further, in this type of camera, it is possible to correct the diaphragm aperture in accordance with the guide members of the illumination device by changing the electric resistivity. Thus, it is possible to employ all kinds of illumination devices.

What is claimed is:

1. A flash mechanism for a camera of the type comprising:
   diaphragm and shutter means for opening and closing a light imaging path in said camera; and
   pin means for driving said diaphragm and shutter means and movable along a predetermined path whose length is proportional to the amount of the opening of said light imaging path; said mechanism comprising:
   diaphragm linkage lever means for entering said path of movement of said driving pin means when an illumination device is attached to said camera, and for retracting from the path of movement of said pin means when the illumination device is detached;
   an intermediate linkage lever means for respectively moving in response to the attachment and detachment of said illumination device and cooperatively linked to said diaphragm linkage lever means for accordingly operating said diaphragm linkage lever means in response to said respective movements;
   rotatable distance ring means for adjusting the focussing of said camera and having a distance cam means thereon for engaging said intermediate linkage lever means to limit the extent of its respective movement in response to the attachment of the illumination device; and
   rotatable exposure correction means for setting the exposure of said camera and which supports and is relatively rotatable to said distance ring means; and wherein the center of rotation of said distance ring means on said exposure correction means is slightly displaced from the rotation center of said exposure correction means such that the position of said distance cam means is laterally displaced upon rotation of said exposure correction means.

2. A flash mechanism as in claim 1, wherein the exposure correction means is a film sensitivity changeover ring.

3. A flash mechanism as in claim 2, wherein the exposure correction means is a guide number changeover ring.

* * * * *